(12) United States Patent
Miyashita et al.

(10) Patent No.: US 8,419,926 B2
(45) Date of Patent: Apr. 16, 2013

(54) ELECTROLYZED WATER PRODUCING METHOD AND APPARATUS

(75) Inventors: Kohichi Miyashita, Wako (JP); Ryuichi Kimata, Wako (JP); Makoto Yamanaka, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 603 days.

(21) Appl. No.: 12/201,260

(22) Filed: Aug. 29, 2008

(65) Prior Publication Data

US 2009/0071843 A1 Mar. 19, 2009

(30) Foreign Application Priority Data

Sep. 19, 2007 (JP) ................................ 2007-242204

(51) Int. Cl.
*C02F 1/461* (2006.01)
*C25B 15/02* (2006.01)
*C25B 9/00* (2006.01)

(52) U.S. Cl.
USPC .............. 205/743; 204/228.1; 204/229.8; 204/237; 204/252; 204/263; 205/746; 205/770

(58) Field of Classification Search .............. 204/229.8, 204/232, 237, 263, 228.1, 252; 205/743, 205/744, 746
See application file for complete search history.

(56) References Cited

U.S. PATENT DOCUMENTS

| | | | | |
|---|---|---|---|---|
| 5,429,723 A | * | 7/1995 | Atkinson | 204/228.6 |
| 6,126,796 A | * | 10/2000 | Shimamune et al. | 204/263 |
| 6,855,233 B2 | * | 2/2005 | Sawada | 204/229.8 |
| 2004/0202921 A1 | * | 10/2004 | Allen | 429/80 |
| 2008/0047844 A1 | * | 2/2008 | Miyashita | 205/743 |

FOREIGN PATENT DOCUMENTS

| | | | |
|---|---|---|---|
| GB | 2 441 427 A | | 3/2008 |
| JP | 09-220572 A | | 8/1997 |
| JP | 11-123381 A | | 5/1999 |
| JP | 2001009454 A | * | 1/2001 |
| JP | 2003062568 A | * | 3/2003 |
| KR | 0133975 B1 | | 4/1998 |
| TW | M 243479 | | 7/2003 |
| TW | 1221521 20041001 | | 10/2004 |

OTHER PUBLICATIONS

Zhengming Miu, "Instrumental Analysis", Nov. 1984, pp. 391-394, Machinery Industry Press.
Office Action dated Mar. 1, 2012 issued in Taiwan Patent Application No. 097121787.

* cited by examiner

*Primary Examiner* — Keith Hendricks
*Assistant Examiner* — Steven A. Friday
(74) *Attorney, Agent, or Firm* — Arent Fox LLP (57) ABSTRACT

Electrolyzed water producing method and apparatus are provided which are capable of producing electrolyzed water having a desired property irrespective of the quality of raw water supplied and the like while allowing the size and weight of the apparatus and the cost to be reduced by limiting the capacity of an electrolysis power source. The electrolyzed water producing method includes: circulating an aqueous electrolyte solution to a first electrolytic chamber of a pair of electrolytic chambers opposed to each other across an intervening ion permeable diaphragm while supplying raw water to the second electrolytic chamber; and applying a predetermined voltage to a pair of electrodes disposed in the respective electrolytic chambers with the diaphragm intervening there between, to electrolyze the raw water and the aqueous electrolyte solution, thereby producing electrolyzed water in the second electrolytic chamber.

9 Claims, 7 Drawing Sheets

ELECTROLYZED WATER PRODUCING METHOD AND APPARATUS

BACKGROUND OF THE INVENTION

1. Field of the Invention

The present invention relates to a method of producing acidic or alkaline electrolyzed water, and an electrolyzed water producing apparatus therefor.

2. Description of the Related Art

Conventionally, there has been known an electrolyzed water producing method which includes: supplying raw water to a pair of electrolytic chambers opposed to each other across an intervening ion permeable diaphragm, such as an anion permeable membrane; and applying voltage to a pair of electrodes disposed in the respective electrolytic chambers, to electrolyze the raw water supplied to the electrolytic chambers. When a chloride salt, such as sodium chloride, is previously added as an electrolyte to the raw water, this method is capable of obtaining acidic electrolyzed water containing hypochlorous acid from the anode-side electrolytic chamber and alkaline electrolyzed water from the cathode-side electrolytic chamber.

Such acidic electrolyzed water exhibits a potent bactericidal action based on the oxidizing power or the like of the hypochlorous acid and hence can be used for disinfection or a like purpose in medical institutions and the like. Such alkaline electrolyzed water can be used for cleaning or a like purpose. However, there are relatively few applications that require both of acidic electrolyzed water and alkaline electrolyzed water at the same time. For this reason, in general, either acidic electrolyzed water or alkaline electrolyzed water is used only, while the other is discarded as waste water. In such a case, a problem arises from the viewpoint of resources saving because a half of the total amount of the raw water is discarded as waste water.

In attempt to solve such a problem, an electrolyzed water producing method has been proposed which includes: supplying raw water to only one electrolytic chamber while circulating an aqueous solution containing an electrolyte (hereinafter will be briefly referred to as "aqueous electrolyte solution") to the other electrolytic chamber; electrolyzing the raw water and the aqueous electrolyte solution; and taking out electrolyzed water produced in the electrolytic chamber supplied with the raw water (see Japanese Patent Laid-Open No. H9-220572 for example).

According to this method, when, for example, acidic electrolyzed water is needed, electrolysis is performed using the electrode disposed in the electrolytic chamber supplied with the raw water as an anode and the electrode disposed in the electrolytic chamber to which the aqueous electrolyte solution is circulated as a cathode. As a result, acidic electrolyzed water is produced in the electrolytic chamber supplied with the raw water (i.e., anode-side electrolytic chamber) and taken out therefrom. Though alkaline electrolyzed water is produced in the other electrolytic chamber, the alkaline electrolyzed water is circulated together with the aqueous electrolyte solution and hence is not discarded as waste water. Thus, the resources can be utilized effectively.

With the method described in the patent document noted above, however, the intensity of generation of electrolytic current varies depending on the electric conductivity of the raw water supplied since the raw water is supplied to only one of the electrolytic chambers while the aqueous electrolyte solution produced during electrolysis is circulated to the other electrolytic chamber. Moreover, the quality of raw water varies greatly in accordance with geographic regions. For example, water obtained from a certain region for use as the raw water exhibits a very low electric conductivity of not more than 10 mS/m, while water obtained from another region exhibits a high electric conductivity of from 40 to 50 [mS/m]. For this reason, when electrolytic current is difficult to generate, the method of the aforementioned patent document is required to raise the voltage applied across the pair of electrodes (i.e., electrolytic voltage) in order to obtain electrolyzed water having a desired property by electrolysis. Accordingly, the method has to use a large-capacity electrolysis power source in order to accommodate a diversity of geographic regions, thus resulting in an inconvenience that the size and weight of the electrolyzed water producing apparatus and the cost are difficult to reduce.

SUMMARY OF THE INVENTION

In view of the aforementioned problems, an object of the present invention is to provide an electrolyzed water producing method and an apparatus therefor which are capable of producing electrolyzed water having a desired property irrespective of the quality of raw water while allowing the size and weight of the apparatus and the cost to be reduced by limiting the capacity of the electrolysis power source.

In order to accomplish this object, the present invention provides an electrolyzed water producing method including steps of: circulating an aqueous electrolyte solution containing an electrolyte to a first electrolytic chamber of a pair of electrolytic chambers opposed to each other across an intervening ion permeable diaphragm while supplying raw water to a second electrolytic chamber of the pair of electrolytic chambers; applying voltage to a pair of electrodes disposed in the respective electrolytic chambers with the diaphragm intervening therebetween, to electrolyze the raw water and the aqueous electrolyte solution, thereby producing electrolyzed water in the second electrolytic chamber; monitoring the electrolytic current and comparing the electrolytic current to a predetermined current; and controlling supply of the electrolyte to the electrolytic solution at a rate to establish and maintain the electrolytic current equal to or greater than the predetermined current while increasing to and maintaining the voltage applied to the electrodes at a predetermined voltage within a first predetermined time.

According to the electrolyzed water producing method of the present invention, electrolyzed water which has an acidic or alkaline property depending on the polarity of the electrode disposed in the second electrolytic chamber of the pair of electrodes is produced in the second electrolytic chamber. The electrolyzed water thus produced is taken out of the second electrolytic chamber and then utilized in an application meeting the acidic or alkaline property of the electrolyzed water.

In the first electrolytic chamber, on the other hand, electrolyzed water is produced which is opposite in property to that produced in the second electrolytic chamber. The electrolyzed water thus produced is circulated together with the aqueous electrolyte solution to the first electrolytic chamber and hence is not discarded as waste water. Thus, the resources can be utilized effectively.

In order to obtain electrolyzed water having a desired property by electrolysis, the voltage applied to the pair of electrodes (i.e., electrolytic voltage) has to be controlled so as to generate a desired electrolytic current for electrolyzed water. Some levels of electric conductivity of raw water supplied to the second electrolytic chamber make it difficult to generate the electrolytic current. In such a case, the desired electrolytic current (stated otherwise, electrolyzed water having a desired property) cannot be obtained unless the electrolytic voltage is increased. That is, in controlling the electrolytic voltage so as to generate a desired electrolytic current, it is assumed that the electrolytic current is difficult to generate because of the raw water having a low electric conductivity or any other reason and the electrolytic current is less than the predetermined current at a point in time at which the first predetermined time has elapsed from the start of electrolysis.

In such a case, the method according to the present invention supplies the electrolyte to the aqueous electrolyte solution and increases the supply of the electrolyte until the electrolytic current is equal to or greater than the predetermined current after the lapse of the first predetermined time, with the voltage applied to the pair of electrodes being kept at the predetermined voltage value. Thereby, the electrolyte concentration of the aqueous electrolyte solution can be adjusted so as to allow the electrolytic current to be generated easily (i.e., to allow electrolysis to occur by causing ions to permeate from the second electrolytic chamber to the first electrolytic chamber). In this case, the electrolytic voltage is kept at the predetermined voltage value and, hence, there is no need to increase the electrolytic voltage. Thus, it is possible to limit the capacity of the electrolysis power source.

Thus, according to the present invention, even when the electrolytic current is difficult to be generated, the supply of the electrolyte is increased to adjust the electrolyte concentration of the aqueous electrolyte solution in order to allow the electrolytic current to be generated easily, thereby making it possible to produce electrolyzed water having a desired property with the electrolytic voltage prevented from becoming excessive while allowing the size and weight of the apparatus and the cost to be reduced by limiting the capacity of the electrolysis power source.

In the electrolyzed water producing method according to the present invention, preferably, the electrolyte is supplied intermittently until the first predetermined time elapses from the start of the electrolysis and then supplied as continuously after the lapse of the first predetermined time to establish and maintain the predetermined current.

In this case, the supply of the electrolyte until the first predetermined time elapses from the start of the electrolysis is conducted, for example, for the purpose of keeping the electrolyte concentration of the aqueous electrolyte solution within a predetermined range. For this reason, there is a relatively sufficient time to spare and, hence, intermittent supply of the electrolyte can serve the purpose. On the other hand, after the lapse of the first predetermined time, the supply of the electrolyte is conducted for the purpose of raising the electrolytic current to the predetermined current. In order for the electrolytic current to reach the predetermined current quickly, the electrolyte has to be supplied rapidly by continuous supply. Thus, by intermittently supplying the electrolyte during the period of time from the start of the electrolysis until the lapse of the first predetermined time and then continuously supplying the electrolyte after the lapse of the predetermined time, electrolyzed water having a desired property can be produced, while the load required to supply the electrolyte is reduced by efficiently driving a pump or the like which is required to supply the electrolyte.

In the electrolyzed water producing method according to the present invention, preferably, when the electrolytic current is equal to or greater than the predetermined current after the lapse of the first predetermined time, the electrolyte is supplied intermittently.

In this case where the electrolytic current has been equal to or greater than the predetermined current value after the lapse of the first predetermined time, since the electrolytic current has reached the predetermined current value, rapid supply of the electrolyte is no longer necessary. Thus, by switching back to the intermittent supply of the electrolyte, electrolyzed water having a desired property can be produced, while the load required to supply the electrolyte is reduced by efficiently driving the pump or the like which is required to supply the electrolyte.

In the electrolyzed water producing method according to the present invention, preferably, when the electrolytic current remains less than the predetermined current even after lapse of a second predetermined time from the point in time at which the first predetermined time has elapsed, the electrolysis is stopped.

In the case where the electrolytic current remains less than the predetermined current even after the lapse of the second predetermined time from the point in time at which the first predetermined time has elapsed, it is possible that: strong alkaline or strong acidic electrolyzed water is produced because of excessive supply of the electrolyte; and electrolyzed water having a desired property is not obtained even when the electrolyte is further supplied to continue the electrolysis because of the raw water having an extremely low electric conductivity. In such a case, by stopping the electrolysis, it becomes possible to prevent strong alkaline or strong acidic electrolyzed water from being produced, as well as to prevent the ongoing of unnecessary electrolysis.

Preferably, an alarm is given to a user before the electrolysis is stopped. In this case, the user can be notified of a possibility that the electrolysis will be stopped, before the electrolysis is stopped after the lapse of the second predetermined time.

An electrolyzed water producing apparatus according to the present invention includes: a pair of electrolytic chambers opposed to each other across an intervening ion permeable diaphragm for example; aqueous electrolyte solution circulating system circulating an aqueous electrolyte solution containing an electrolyte to a first electrolytic chamber of the pair of electrolytic chambers; raw water supply supplying raw water to a second electrolytic chamber of the pair of electrolytic chambers; a pair of electrodes disposed in the respective electrolytic chambers with the diaphragm intervening therebetween; voltage control means which produces electrolyzed water in the second electrolytic chamber by applying and controlling voltage to the pair of electrodes to electrolyze the raw water and the aqueous electrolyte solution; where the apparatus further includes an electrolyte supply unit supplying the electrolyte to the aqueous electrolyte solution; and electrolysis control means for controlling supply of the electrolyte by the electrolyte supply unit to the electrolytic solution circulating system at a rate to establish and maintain an electrolytic current equal to or greater than a predetermined current while the voltage control means increases to and maintains the voltage applied to the electrodes at a predetermined voltage within a first predetermined time.

In the electrolyzed water producing apparatus according to the present invention, it is possible that: the electrolyte supply means is capable of switching between an intermittent operation and a continuous operation; and the electrolysis control means is configured to cause the electrolyte supply means to operate intermittently until the first predetermined time elapses from the start of the electrolysis and then operate continuously after lapse of the first predetermined time to establish and maintain the predetermined current.

When the electrolytic current reaches the value of not less than the predetermined current after lapse of the first predetermined time, the electrolysis control means preferably causes the electrolyte supply unit to switch to the intermittent operation.

Preferably, the electrolyzed water producing apparatus further includes electrolysis stopping means for stopping the electrolysis when the electrolytic current remains less than the predetermined current even after lapse of the second predetermined time from the point in time at which the first predetermined time has elapsed. In this case, the electrolyzed water producing apparatus preferably includes alarm outputting means for giving an alarm to a user before the electrolysis is stopped by the electrolysis stopping means.

DETAILED DESCRIPTION OF THE PREFERRED EMBODIMENT

Hereinafter, an embodiment of the present invention will be described in detail with reference to the attached drawings.

Figure 1:
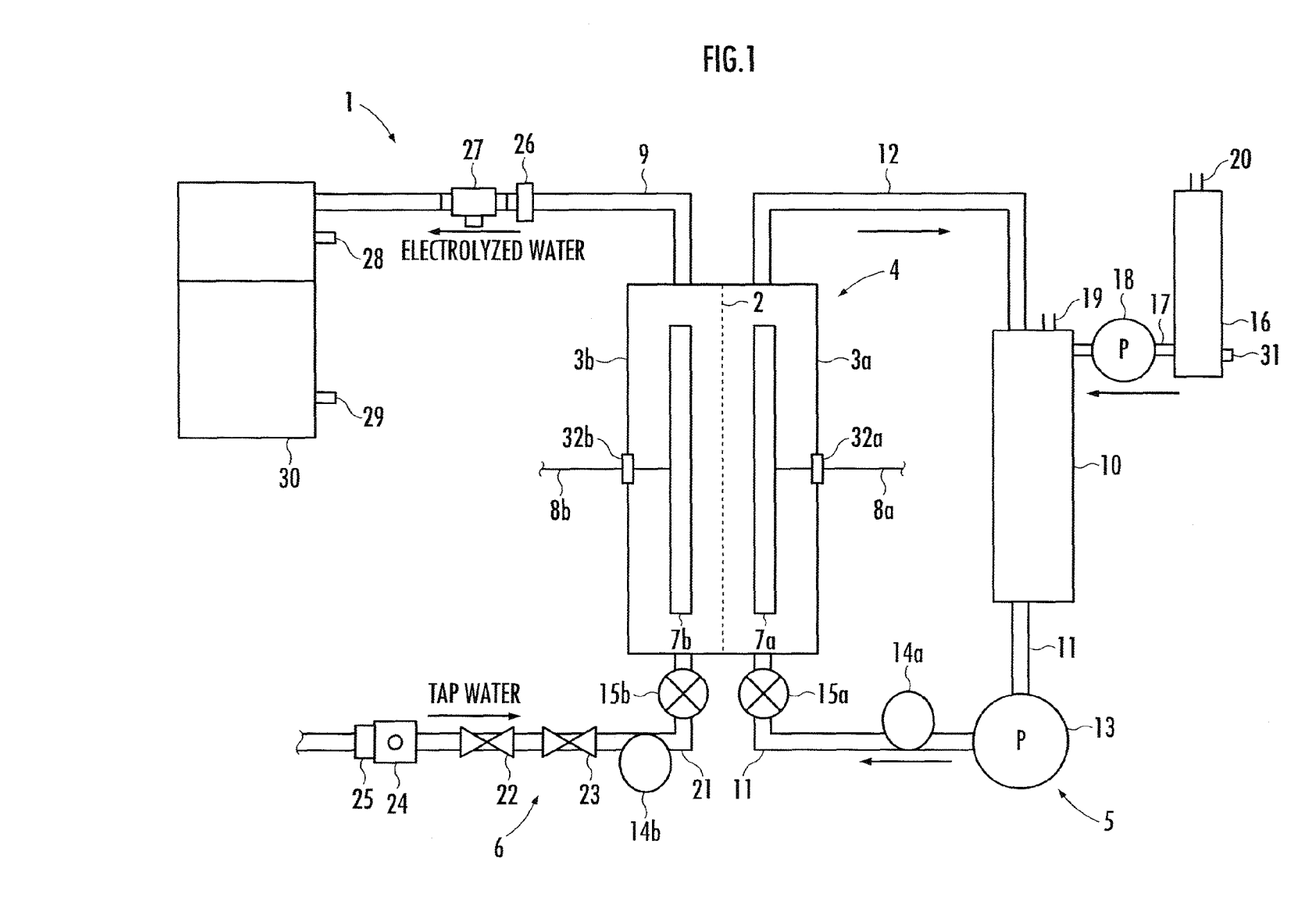
FIG. 1 is a schematic view showing an electrolyzed water producing apparatus for use in an electrolyzed water producing method according to an embodiment of the present invention.

As shown in FIG. 1, an electrolyzed water producing apparatus 1 according to the present embodiment is provided with an electrolytic cell 4 including a pair of electrolytic chambers 3a and 3b opposed to each other across an intervening ion permeable diaphragm 2; an aqueous electrolyte solution circulation system 5 for circulating an aqueous electrolyte solution containing an electrolyte to the electrolytic chamber 3a; and a raw water supply system 6 for supplying raw water to the electrolytic chamber 3b. A pair of electrodes 7a and 7b are disposed in the pair of electrolytic chambers 3a and 3b with the diaphragm 2 intervening therebetween. The electrodes 7a and 7b are connected to an electrolysis power source 52 and to an electrolysis control unit 54 through respective conductive wires 8a and 8b. The electrolysis power source 52 and the electrolysis control unit 54 will be described later. Electrode temperature sensors 32a and 32b are provided adjacently to the respective electrodes 7a and 7b for measuring the temperatures of the respective electrodes 7a and 7b.

The electrolytic chamber 3b is provided with an electrolyzed water takeout conduit 9 for taking out electrolyzed water produced in the electrolytic chamber 3b by electrolysis of the raw water and the aqueous electrolyte solution which is performed by applying voltage to the pair of electrodes 7a and 7b. The electrolyzed water takeout conduit 9 is connected to an upper portion of the electrolytic chamber 3b and provided on an intermediate portion thereof with an outlet joint 26 and a three-way valve 27 in this order from the upstream side. The electrolyzed water takeout conduit 9 is also connected to an upper portion of a water storage tank 30 for storing therein the electrolyzed water produced. The water storage tank 30 is fitted with a full water level switch 28 for detecting a full water condition of the electrolyzed water stored in the tank 30, and a drought water level switch 29 for detecting a drought water condition of the electrolyzed water. The full water level switch 28 switches to a detecting position when the electrolyzed water stored is at a predetermined full water level or more and to a non-detecting position when the electrolyzed water is short of reaching the full water level. The drought water level switch 29 switches to a detecting position when the electrolyzed water stored is at a predetermined drought water level or more and to a non-detecting position when the electrolyzed water is short of reaching the drought water level.

The aqueous electrolyte solution circulation system 5 includes an aqueous electrolyte solution tank 10, an aqueous electrolyte solution supply conduit 11 for taking out the aqueous electrolyte solution stored in the aqueous electrolyte solution tank 10 and supplying the aqueous electrolyte solution to a bottom portion of the electrolytic chamber 3a, and an aqueous electrolyte solution return conduit 12 for taking out the aqueous electrolyte solution from an upper portion of the electrolytic chamber 3a and returning the aqueous electrolyte solution to an upper portion of the aqueous electrolyte solution tank 10. The aqueous electrolyte solution supply conduit 11 is connected to the bottom portion of the electrolytic chamber 3a with a pump 13 disposed at an intermediate portion thereof, a flow sensor 14a located downstream of the pump 13, and a flow regulating valve 15a thereafter.

The aqueous electrolyte solution tank 10 is connected to an electrolyte tank 16 storing therein the electrolyte to be supplied to the aqueous electrolyte solution circulating to the electrolytic chamber 3a, via an electrolyte supply conduit 17. The electrolyte tank 16 is fitted with an electrolyte tank level switch 31 for detecting the level of the electrolyte stored therein. The electrolyte tank level switch 31 switches to a detecting position when the electrolyte stored is at a predetermined level or more and to a non-detecting position when the stored electrolyte is short of reaching the predetermined level. The electrolyte supply conduit 17 is provided at an intermediate portion thereof with an electrolyte supply pump 18 for supplying the electrolyte stored in the electrolyte tank 16 to the electrolytic chamber 3a. The operation of the electrolyte supply pump 18 can be switched between an intermittent operation and a continuous operation. In the present embodiment, it is configured to supply the electrolyte (aqueous solution) from the electrolyte tank 20 to the aqueous electrolyte solution tank 10. Thereby, it is possible to supply the electrolyte to the aqueous electrolyte solution circulation system 5 by using a simple and inexpensive pump, such as a tubular pump, as the electrolyte supply pump 18. Therefore, the present embodiment does not need to use a metering pump with a backflow valve, which is generally used in this type of apparatus.

The tanks 10 and 16 have air vent valves 19 and 20, respectively, at their respective upper portions.

The raw water supply system 6 includes a raw water supply conduit 21 for supplying raw water supplied from a non-illustrated raw water supply source, such as a water supply tap, to a bottom portion of the electrolytic chamber 3b. The raw water supply conduit 21 is provided on an intermediate portion thereof with an inlet joint 25, a water temperature sensor 24, a pressure reducing valve 22, a shut-off valve 23, and a flow sensor 14b, which are arranged in this order from the upstream side. The raw water supply conduit 21 is connected to the bottom portion of the electrolytic chamber 3b via a flow regulating valve 15b.

While the present embodiment uses the electrolyte supply pump 18 located at the intermediate portion of the electrolyte supply conduit 17, an on-off valve may be used instead of the electrolyte supply pump 18. In this case, the positional relation between tanks 10 and 16 has to be such that the tank 16 is located above the tank 10.

Figure 2:
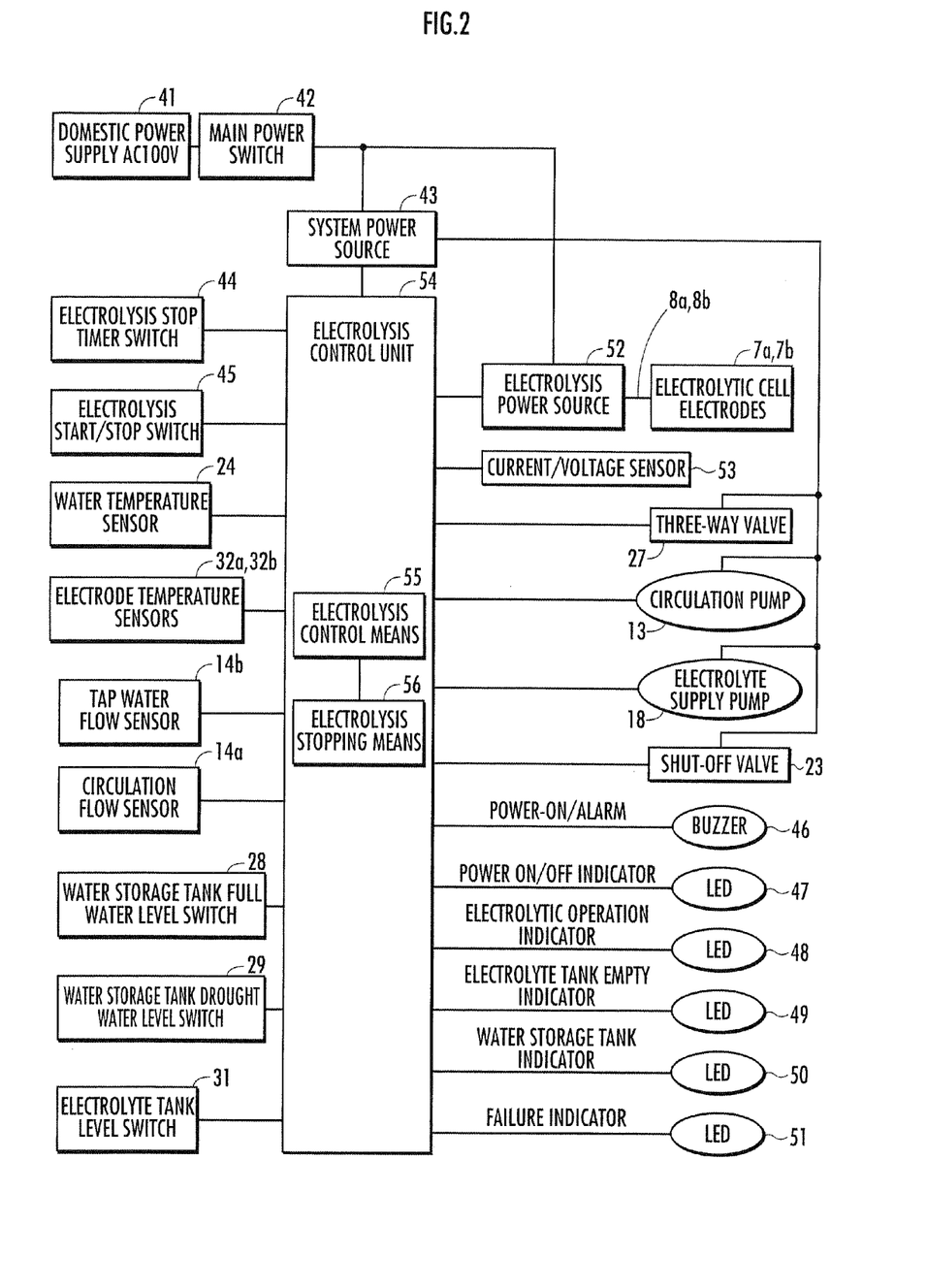
FIG. 2 is a block diagram showing a control system of the electrolyzed water producing apparatus shown in FIG. 1.

As shown in FIG. 2, the electrolyzed water producing apparatus 1 includes the electrolysis control unit 54 which is an electronic unit comprising a computer configured to perform various arithmetic processing (i.e., an arithmetic processing circuit comprising a CPU, memory, input/output circuits, and the like, or a microcomputer in which the functions of these components are integrated), and other components.

The electrolysis control unit 54 controls the pumps and valves based on inputs from the sensors and switches to perform the electrolyzed water producing process and the like. These processes are realized by the electrolysis control unit 54 through executing programs previously stored in the memory of the electrolysis control unit 54.

The electrolysis control unit 54 is connected to each of the aforementioned water temperature sensor 24, electrode temperature sensors 32a and 32b, tap water flow sensor 14b, circulation flow sensor 14a, water storage tank full water level switch 28, water storage tank drought water level switch 29, and electrolyte tank level switch 31. Detection data obtained by these sensors are inputted to the electrolysis control unit 54. The electrolysis control unit 54 is also connected to each of the aforementioned three-way valve 27, circulation pump 13, electrolyte supply pump 18, and shut-off valve 23, and controls the operations of these valves and pumps.

Also, the electrolysis control unit 54 is connected to an electrolysis start/stop switch 45 which provides instructions to start and stop the electrolyzed water producing process according to operations of the user, and an electrolysis stop timer switch 44 which sets a period of time for which the electrolyzed water producing process is to be performed according to operations of the user.

Also, the electrolysis control unit 54 is connected with a buzzer 46 which makes sound upon powering-on or alarming, a power on/off indicator LED 47, an electrolytic operation indicator LED 48, an electrolyte tank empty indicator LED 49, a water storage tank indicator LED 50, and a failure indicator LED 51. The power on/off indicator LED 47 lights when the electrolysis power source 52 is in an on-state (i.e., standby state ready to start electrolysis) and stays out when the power source 52 is in an off-state. The electrolysis operation indicator LED 48 is turned on when the electrolysis starts and turned off when the electrolysis stops. The electrolyte tank empty indicator LED 49 lights when the electrolyte tank level switch 31 is in the detecting position and stays out when the switch 31 is in the non-detecting position. The water storage tank indicator LED 50 lights when the water storage tank full water level switch 28 is in the detecting position or the water storage tank drought water level switch 29 is in the non-detecting position and stays out under the other conditions. The failure indicator LED 51 is turned on upon occurrence of any failure and stays out under normal conditions.

Also, the electrolysis control unit 54 is connected with the electrolysis power source 52 which applies voltage to the electrodes 7a and 7b through the conductive wires 8a and 8b, and a current/voltage sensor 53 for measuring current/voltage values of power supplied from the electrolysis power source 52.

Further, the electrolysis control unit 54 is connected with a system power source 43 which supplies voltage for operating each of the electrolysis control unit 54, circulation pump 13, electrolyte supply pump 18, three-way valve 27, and shut-off valve 23. The electrolysis power source 52 and the system power source 43 are each supplied with voltage from a domestic power supply (AC 100V) via a main power switch 42.

More specifically, the electrolysis control unit 54 includes an electrolysis control means 55 and an electrolysis stopping means 56 as its functions. When an electrolytic current generated by electrolysis is less than a predetermined current value IA at a point in time at which a first predetermined time T1 has elapsed from start of electrolysis, the electrolysis control means 55 controls the electrolyte supply pump 18 so as to increase the supply of the electrolyte until the electrolytic current reaches a value of not less than the predetermined current value IA after lapse of the first predetermined time T1, with the voltage applied across the pair of electrodes 7a and 7B from the electrolysis power source 52 being kept at a predetermined voltage value $V_A$. The electrolysis stopping means 56 stops electrolysis by controlling the electrolysis power source 52, three-way valve 27, electrolyte supply pump 18, circulation pump 13 and shut-off valve 23 when the electrolytic current fails to reach the predetermined current value IA even after lapse of a second predetermined time T2 from the point in time at which the first predetermined time T1 has elapsed.

Next, referring to the flowchart of FIG. 3, description will be made of general operation (i.e., electrolyzed water producing operation) of the electrolyzed water producing apparatus 1 according to the present embodiment.

Figure 3:
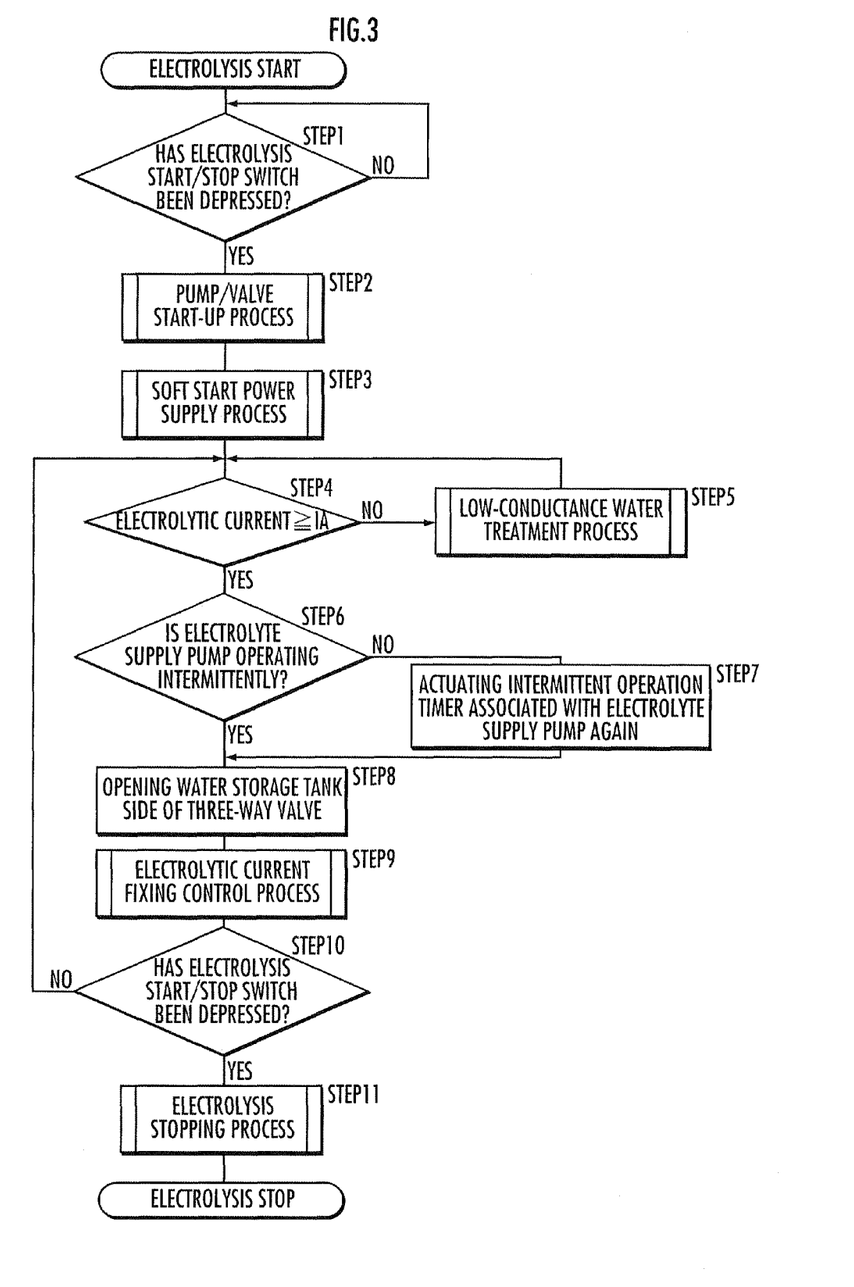
FIGS. 3 to 8 are flowcharts showing entirely an electrolyzed water producing process performed by the electrolyzed water producing apparatus shown in FIG. 1.

As shown in FIG. 3, at STEP 1, judgment is made as to whether or not the electrolysis start/stop switch 45 has been depressed. When the judgment at STEP 1 is "NO", STEP 1 is repeated until the judgment at STEP 1 changes to "YES".

Figure 4:
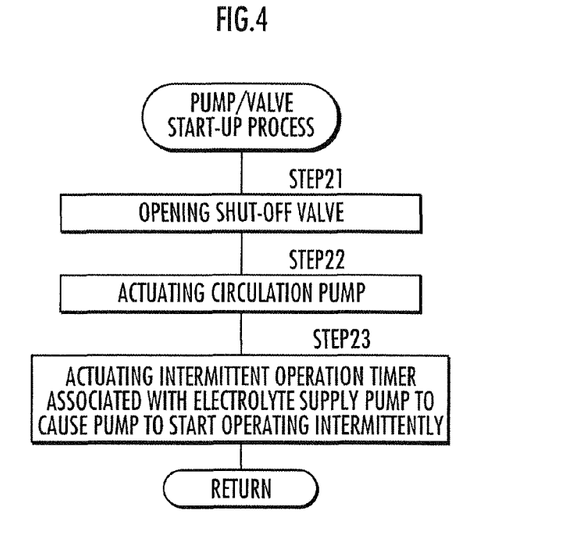

When the judgment at STEP 1 is "YES", the process proceeds to STEP 2 at which a pump/valve start-up process is performed. The pump/valve start-up process proceeds as shown in FIG. 4. In the pump/valve start-up process, initially at STEP 21, the shut-off valve 23 is opened. Subsequently, at STEP 22, the circulation pump 13 is caused to start operating. Thereafter, at STEP 23, an electrolyte pump operation timer is actuated to cause the electrolyte pump 10 to start operating intermittently. Such an intermittent operation is performed with action time $T_{on}$ and interval time $T_{int}$ set to 10 seconds and 50 seconds, respectively. Thus, the pump/valve start-up process is ended.

Figure 5:
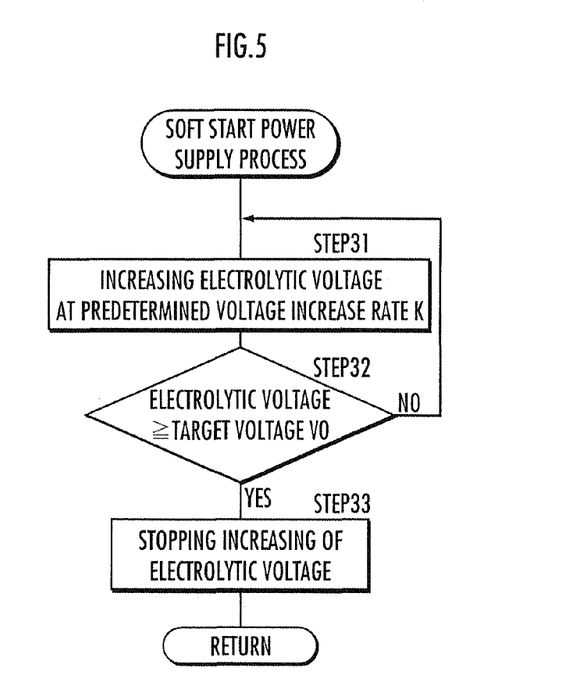

Referring back to FIG. 3, subsequently at STEP 3, a soft start power supply process is performed. The soft start power supply process proceeds as shown in FIG. 5. In the soft start power supply process, initially at STEP 31, the electrolytic voltage applied to the electrodes 7a and 7b from the electrolysis power source 52 is increased at a predetermined voltage increase rate K. The voltage increase rate K used here is 0.5 V/sec for example. Subsequently, at STEP 32, judgment is made as to whether or not the electrolytic voltage assumes a value of not less than a predetermined target voltage $V_0$. The target voltage $V_0$ used here is 20V for example. When the judgment at STEP 32 is "NO", the process returns to STEP 31 to repeat STEP 31 and STEP 32 until the judgment at STEP 32 changes to "YES". That is, STEP 31 and STEP 32 are repeated until the first predetermined time T1 elapses. The first predetermined time T1 is a predetermined value determined from the voltage increase rate K and the target voltage $V_0$ (T1=$V_0$/K). When the judgment at STEP 32 is "YES", the process proceeds to STEP 33 at which the increasing of the electrolytic voltage is stopped. Thus, the soft start power supply process is ended.

Referring back to FIG. 3, subsequently at STEP 4, judgment is made as to whether or not the electrolytic current generated by electrolysis is equal to or greater than the predetermined current value IA. When the judgment at STEP 4 is "NO", the process proceeds to STEP 5 to perform a low-conductivity water treatment process and then returns to STEP 4.

Figure 6:
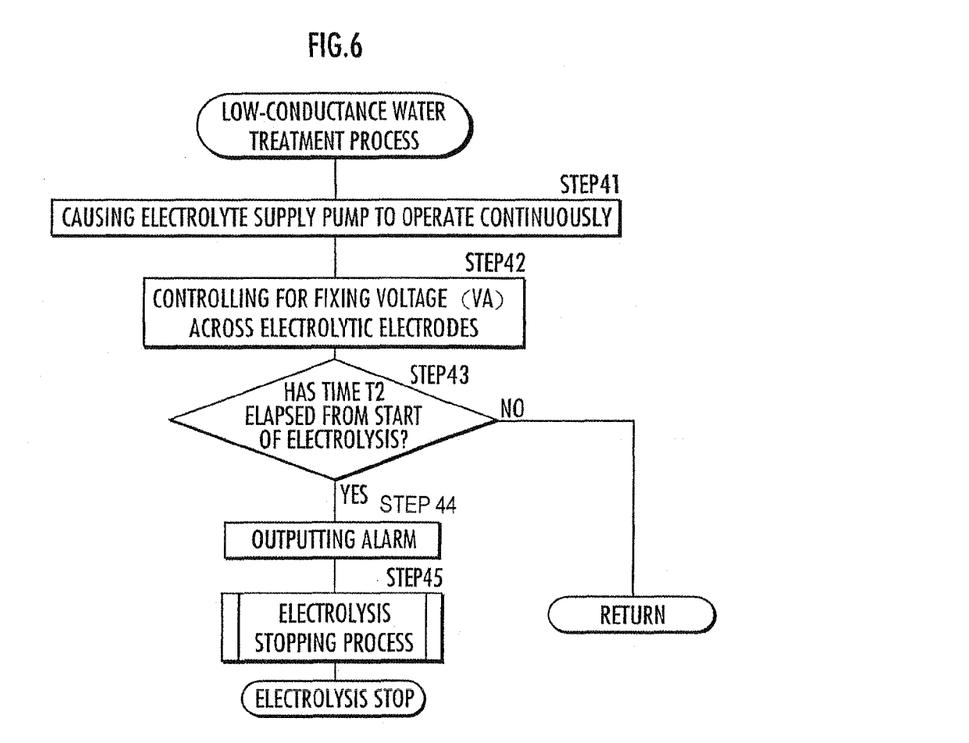

The low-conductivity water treatment process proceeds as shown in FIG. 6. In the low-conductivity water treatment process, initially at STEP 41, the operation of the electrolyte supply pump 18 is switched to the continuous operation. Subsequently, at STEP 42, a control is performed so that the electrolytic voltage assumes the predetermined voltage value $V_A$. The predetermined voltage value $V_A$ used here is 20V for example. Subsequently, at STEP 43, judgment is made as to whether or not the second predetermined time T2 has elapsed from the start of electrolysis. The second predetermined time T2 used here is 180 seconds for example. When the judgment at STEP 43 is "NO", the low-conductivity water treatment process is ended and the process returns to STEP 4 of FIG. 3. When the judgment at STEP 43 is "YES", the process proceeds to STEP 44 at which an alarm is outputted. Subsequently, at STEP 45, an electrolysis stopping process is performed to stop electrolysis, and the low-conductivity water treatment process is ended.

Figure 7:
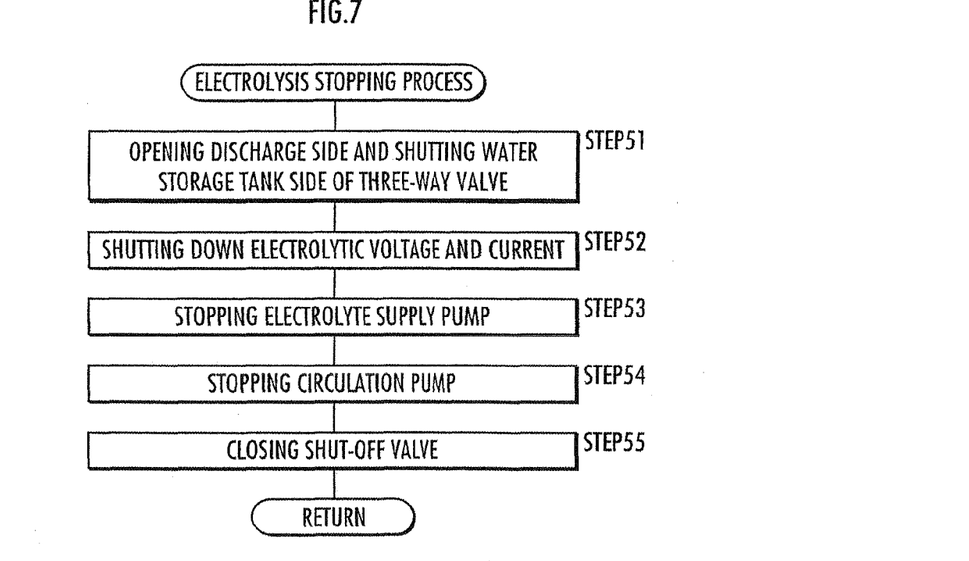

The electrolysis stopping process proceeds as shown in FIG. 7. In the electrolysis stopping process, initially at STEP 51, the discharge side of the three-way valve 27 is opened, while the water storage side is shut off. Subsequently, at STEP 52, the electrolytic voltage and the electrolytic current are shut down. Subsequently, at STEP 53, the electrolyte supply pump 18 is stopped. Subsequently, at STEP 54, the circulation pump 13 is stopped. Subsequently, at STEP 55, the shut-off valve 23 is closed. Thus, the electrolyte stopping process is ended.

Referring back to FIG. 3, when the judgment at STEP 4 is "YES", the process proceeds to STEP 6 at which judgment is made as to whether or not the electrolyte supply pump 18 is operating intermittently. When the judgment at STEP 6 is "NO", the process proceeds to STEP 7 at which the intermittent operation timer associated with the electrolyte supply pump 18 is actuated again, and then proceeds to STEP 8. When the judgment at STEP 6 is "YES", the process proceeds directly to STEP 8.

Figure 8:
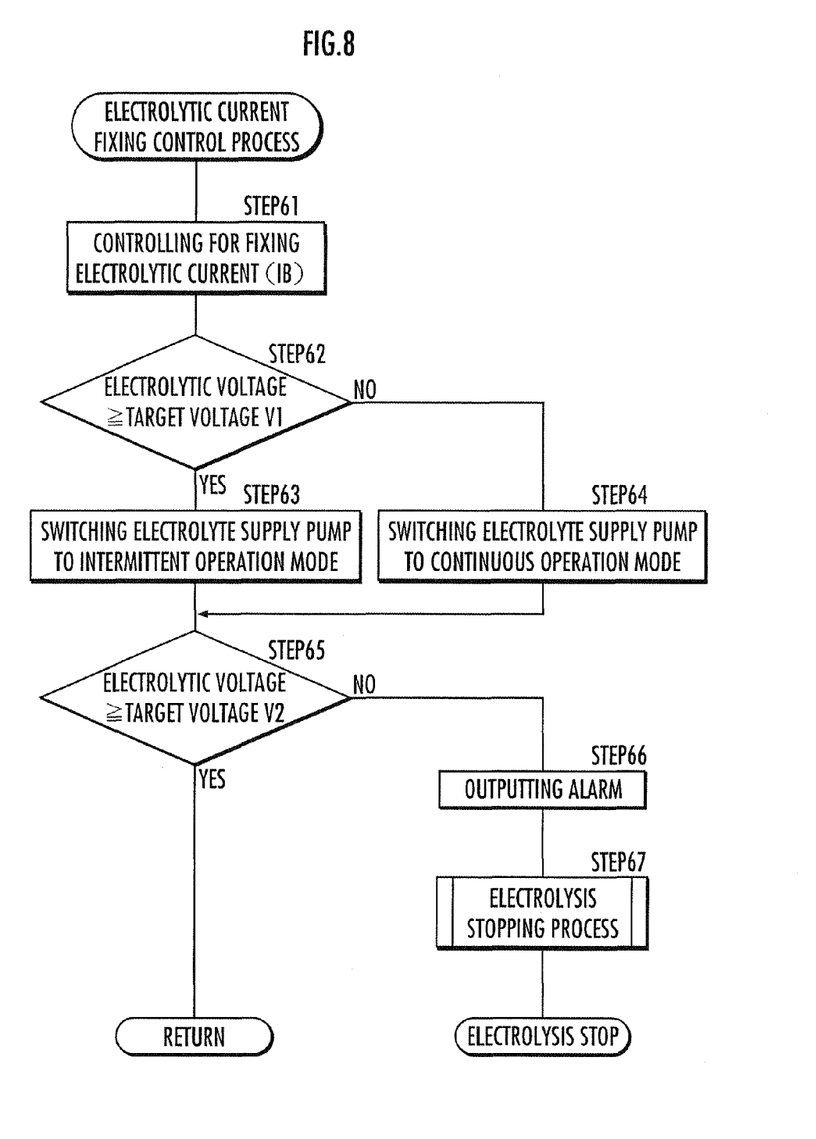

Subsequently, at STEP 8, the water storage tank side of the three-way valve 27 is opened. Subsequently, at STEP 9, an electrolytic current fixing control process is performed. The electrolytic current fixing control process proceeds as shown in FIG. 8.

In the electrolytic current fixing control process, initially at STEP 61, a control is performed so that the electrolytic current reaches a predetermined target current IB. The predetermined target current IB used here is 10 A for example. Subsequently, at STEP 62, judgment is made as to whether or not the electrolytic voltage is equal to or greater than a predetermined target voltage $V_1$. The predetermined target voltage $V_1$ used here is 20V for example. When the judgment at STEP 62 is "YES", the process proceeds to STEP 63 at which the operation of the electrolyte supply pump 18 is switched to the intermittent operation, and then proceeds to STEP 65. When the judgment at STEP 62 is "NO", the process proceeds to STEP 64 at which the operation of the electrolyte supply pump 18 is switched to the continuous operation, and then proceeds to STEP 65.

Subsequently, at STEP 65, judgment is made as to whether or not the electrolytic voltage is equal or greater than a predetermined target voltage $V_2$. The predetermined target voltage $V_2$ used here is 22V for example. When the judgment at STEP 65 is "YES", the electrolytic current fixing control process is ended and the process returns to STEP 9 of FIG. 3.

When the judgment at STEP 65 is "NO", the process proceeds to STEP 66 at which an alarm is outputted (for example, the buzzer 46 sounds.) Subsequently, the process proceeds to STEP 67 at which the above-described electrolysis stopping process shown in FIG. 7 is performed. Thus, electrolysis is stopped, and the electrolytic current fixing control process and the electrolyzed water producing process are ended.

Referring back to FIG. 3, subsequently at STEP 10, judgment is made as to whether or not the electrolysis start/stop switch 45 has been depressed. When the judgment at STEP 10 is "NO", the process returns to STEP 4 to repeat STEP 4 to STEP 9.

When the judgment at STEP 10 is "YES", the process proceeds to STEP 11 to perform the aforementioned electrolysis stopping process shown in FIG. 7. Thus, electrolysis is stopped and the electrolyzed water producing process is ended.

The electrolyzed water producing process is thus performed by the electrolyzed water producing apparatus 1.

Figure 9:
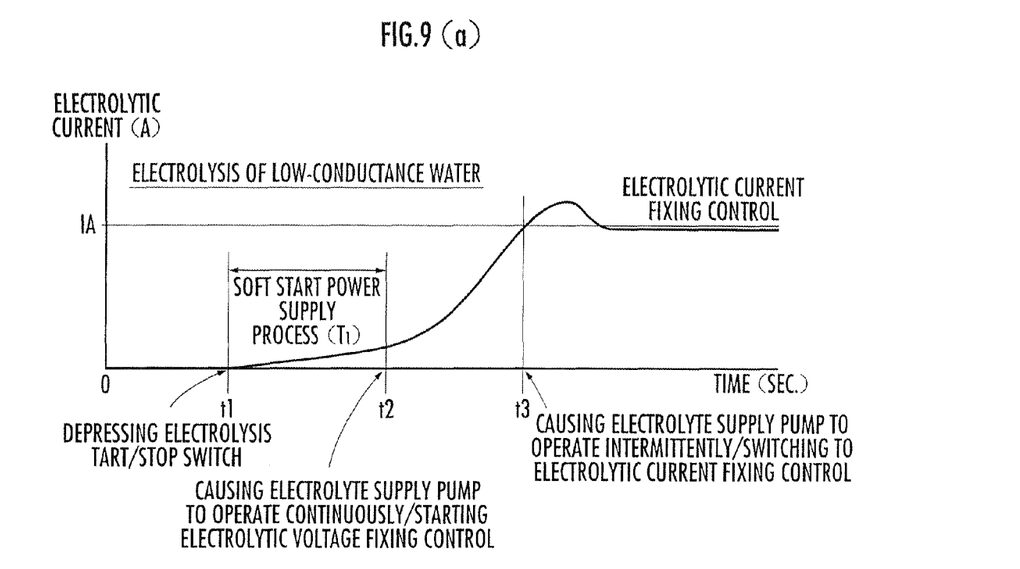
FIGS. 9(A) and 9(B) are graphs showing a temporal variation of electrolytic current generated in the electrolyzed water producing process of FIG. 3, respectively.

Next, the above-described electrolyzed water producing process will be specifically described with reference to the graph of FIG. 9.

The following description is directed to an arrangement wherein: the diaphragm 2 shown in FIG. 1 is an anion-exchange membrane; and the electrode 7a disposed in the electrolytic chamber 3a and the electrode 7b disposed in the electrolytic chamber 3b serve as a cathode and an anode, respectively. As a result, the electrolytic chamber 3a serves as a cathode-side electrolytic chamber, while the electrolytic chamber 3b serves as an anode-side electrolytic chamber.

First, the circulation of the aqueous electrolyte solution and the production of electrolyzed water in this arrangement will be summarized. For example, the aqueous electrolyte solution circulation system 5 circulates an aqueous sodium chloride solution (e.g., 0.085 mol/L) as the aqueous electrolyte solution to the electrolytic chamber 3a, and tap water is supplied to the electrolytic chamber 3b through the raw water supply conduit 21 as raw water. Then, a predetermined voltage is applied to the electrodes 7a and 7b from the electrolysis power source 52 to electrolyze the aqueous sodium chloride solution and tap water.

By so doing, alkaline electrolyzed water is obtained in the cathode-side electrolytic chamber 3a because sodium chloride is ionized into sodium ions ($Na^+$) and chlorine ions ($Cl^-$) while water is electrolyzed into hydrogen ($H_2$) and hydroxide ions ($OH^-$), as represented by the following formulae:

$$NaCl \rightarrow Na^+ + Cl^-$$

$$2H_2O + 2e^- \rightarrow H_2 + 2OH^-$$

Since the anion-exchange membrane is disposed between the electrolytic chambers 3a and 3b as the diaphragm 2, the sodium ions are blocked by the anion-exchange membrane and hence cannot permeate into the anode-side electrolytic chamber 3b. For this reason, only the chlorine ions permeate into the anode-side electrolytic chamber 3b. As a result, acidic electrolyzed water is obtained in the anode-side electrolytic chamber 3b because chlorine ($Cl_2$) produced from the chlorine ions is allowed to further react with water to give hypochlorous acid (HClO) while water is electrolyzed into oxygen ($O_2$) and hydrogen ions ($H^+$), as represented by the following formulae:

$$2Cl^- \rightarrow Cl_2 + 2e^-$$

$$Cl_2 + 2H_2O \rightarrow 2HClO + 2H^+$$

$$H_2O \rightarrow \tfrac{1}{2}O_2 + 2e^-$$

Thus, acidic electrolyzed water containing hypochlorous acid can be taken out from an upper portion of the anode-side electrolytic chamber 3b through the electrolyzed water take-out conduit 9. Since the sodium ions cannot permeate into the anode-side electrolytic chamber 3b as described above, the acidic electrolyzed water is substantially free of sodium chloride and, hence, it is possible to prevent corrosion of metal from being facilitated. Also, since the aqueous electrolyte solution circulation system 5 circulates the aqueous sodium chloride solution to the cathode-side electrolytic chamber 3a, the alkaline electrolyzed water produced in the cathode-side electrolytic chamber 3a is circulated as mixed into the aqueous sodium chloride solution and hence is not discarded as waste water.

With reference to the graphs of FIG. 9, description will be made of the control over the electrolyte supply and the electrolytic current and voltage in the above-described arrangement.

FIGS. 9(A) and 9(B) are graphs showing a temporal variation of the electrolytic current in the electrolyzed water producing process, respectively. In each of FIGS. 9(A) and 9(B), the horizontal axis represents time [sec] and the vertical axis represents the electrolytic current [A]. In the case of FIG. 9(A), raw water (tap water) supplied to the electrolytic chamber 3b is low-conductivity water (having an electric conductivity of 7 to 15 mS/m, for example). In the case of FIG. 9(B), raw water (tap water) supplied to the electrolytic chamber 3b is normal-conductivity water (having an electric conductivity of 20 to 30 mS/m for example).

First, description is directed to the case of FIG. 9(B) in which normal-conductivity water is used. When the electrolysis start/stop switch 45 is depressed at a timing t1, the pump/valve start-up process is performed. Subsequently, the soft start power supply process is performed until the first predetermined time T1 elapses. Since the electrolytic current reaches the predetermined current value IA at a timing t2 at which the first predetermined time T1 has elapsed, the electrolytic current fixing control process is performed after the timing t2. Actually, the current value is gradually increased to the target current in the electrolytic current fixing control process.

As the aqueous sodium chloride solution circulates as described above after the start of electrolysis at the timing t1, the hydroxide ion concentration increases with time, thus causing the aqueous sodium chloride solution to exhibit strong alkalinity. Thereby, the present embodiment is configured to store hydrochloric acid preliminarily in the electrolyte tank 16 and add the hydrochloric acid to the aqueous sodium chloride solution so as to keep the sodium chloride concentration of the aqueous sodium chloride solution within a predetermined range as well as the pH value of the solution within a predetermined region. For this purpose, the hydrochloric acid concentration is set at 2 mol/L or less, for example, 1 mol/L.

The electrolyte supply pump 18 is driven so as to operate intermittently. Specifically, the electrolyte supply pump 18 operates once per predetermined time (for example one minute) for action time $T_{on}$ (for example 10 seconds). The action time $T_{on}$ in the intermittent operation is determined as a time period which allows acid to be added in an amount substantially equivalent to the amount of alkali produced during the predetermined time period.

Thus, the aqueous sodium chloride solution can be prevented from exhibiting strong alkalinity even when circulated repeatedly.

The following description is directed to the case of FIG. 9(A) in which low-conductivity water is used. As in the case of FIG. 9(B), when the electrolysis start/stop switch 45 is depressed at the timing t1, the pump/valve start-up process is performed. Subsequently, the soft start power supply process is performed until the first predetermined time T1 elapses. The electrolyte supply pump 18 is driven so as to operate intermittently as in the case of FIG. 9(B) until the first predetermined time T1 elapses. Hydrochloric acid stored in the electrolyte tank 16 is added to the aqueous sodium chloride solution so as to keep the sodium chloride concentration of the aqueous sodium chloride solution within a predetermined range as well as the pH value of the solution within a predetermined region.

Since it is difficult to generate the electrolytic current because of low-conductivity water supplied in the case of FIG. 9(A), the electrolytic current fails to reach the predetermined current value IA at the timing t2 at which the first predetermined time T1 has elapsed. Therefore, the low-conductivity water treatment process is performed. Specifically, the operation of the electrolyte supply pump 18 is switched to the continuous operation to increase the supply of the electrolyte until the electrolytic current is equal to or greater than the predetermined current value IA, with the electrolytic voltage being kept at the predetermined voltage value $V_A$. The supply of the electrolyte is increased to adjust the electrolyte concentration of the aqueous electrolyte solution so as to allow the electrolytic current to be generated easily, whereby the electrolytic current can assume a current value which allows electrolyzed water having a desired property to be produced without raising the electrolytic voltage.

When the electrolytic current is equal to or greater than the predetermined current value IA at a timing t3, the electrolytic current fixing control process is performed. When the electrolytic voltage is less than the target voltage $V_1$ in the electrolytic current fixing control process, the electrolyte supply pump 18 is driven so as to operate intermittently as in the case of FIG. 9(B). Thus, hydrochloric acid stored in the electrolyte tank 16 is added to the aqueous sodium chloride solution so as to keep the sodium chloride concentration of the aqueous sodium chloride solution within a predetermined range as well as the pH value of the solution within a predetermined region.

On the other hand, when the electrolytic voltage is not less than the target voltage $V_1$, the electrolyte supply pump 18 is driven so as to operate continuously. That is, since the electric conductivity of raw water supplied is low, it is assumed that it is necessary to conduct electrolysis by allowing ions to permeate from the cathode side (i.e., circulation tank side) toward the anode side. At that time, the electrolysis supply pump 18 is operated continuously to increase the supply of the electrolyte to the aqueous electrolyte solution tank 10.

When the electrolytic voltage exceeds the voltage value $V_2$, the electrolysis stopping process is performed for safety.

As described above, even when the electrolytic current is difficult to generate due to low-conductivity water supplied as raw water, the electrolyzed water producing method according to the present embodiment and the electrolyzed water producing apparatus implementing the method can prevent the electrolytic voltage from becoming excessive by increasing the supply of the electrolyte to adjust the electrolyte concentration of the aqueous electrolyte solution to a value which allows the electrolytic current to be generated easily. Thus, the method and apparatus are capable of producing electrolyzed water having a desired property irrespective of the quality of raw water supplied while allowing the size and weight of the apparatus and the cost to be reduced by limiting the capacity of the electrolysis power source.

What is claimed is:

1. An electrolyzed water producing method, comprising steps of:
   circulating an aqueous electrolyte solution containing a supplied electrolyte to a first electrolytic chamber of a pair of electrolytic chambers opposed to each other across an intervening ion permeable diaphragm while supplying raw water to a second electrolytic chamber of the pair of electrolytic chambers;
   applying voltage at an electrolytic voltage level to a pair of electrodes disposed in the respective electrolytic chambers with the diaphragm intervening therebetween, to electrolyze the raw water and the aqueous electrolyte solution, thereby producing electrolyzed water in the second electrolytic chamber;
   monitoring an electrolytic current generated by the applied voltage and comparing the electrolytic current to a predetermined current;
   and
   controlling supply of the electrolyte to the electrolyte solution to increase the electrolytic current;
   wherein applying voltage at the electrolytic voltage level to the pair of electrodes comprises increasing the electrolytic voltage level during a first predetermined time and maintaining the electrolytic voltage level at a predetermined voltage level after the first predetermined time when the electrolytic current is less than the predetermined current after the first predetermined time; and
   wherein the first predetermined time is an amount of time required for the electrolytic current to reach the predetermined current in a case where a predetermined amount of electrolyte is provided to the aqueous electrolyte solution after starting the electrolysis of water, the predetermined amount of electrolyte being an amount to maintain a concentration of the aqueous electrolyte solution within a predetermined range as well as to maintain a pH value within a predetermined region.

2. The electrolyzed water producing method according to claim 1, wherein the electrolyte is supplied intermittently until the first predetermined time elapses from the start of the electrolysis and then supplied continuously after the lapse of the first predetermined time to establish and maintain the predetermined current.

3. The electrolyzed water producing method according to claim 2, wherein when the electrolytic current is equal to or greater than the predetermined current after the lapse of the first predetermined time, the electrolyte is supplied intermittently.

4. The electrolyzed water producing method according to claim 1, wherein when the electrolytic current remains less than the predetermined current even after lapse of a second predetermined time from the point in time at which the first predetermined time has elapsed, the electrolysis is stopped.

5. The method of claim 1, wherein the electrolytic current increases to be equal to or greater than the predetermined current after the first predetermined time.

6. An electrolyzed water producing apparatus comprising:
   a pair of electrolytic chambers opposed to each other across an intervening ion permeable diaphragm;
   an aqueous electrolyte solution circulating system circulating an aqueous electrolyte solution containing an electrolyte to a first electrolytic chamber of the pair of electrolytic chambers;
   a raw water supply supplying raw water to a second electrolytic chamber of the pair of electrolytic chambers;
   a pair of electrodes disposed in the respective electrolytic chambers with the diaphragm intervening therebetween;
   a voltage control means which produces electrolyzed water in the second electrolytic chamber by applying voltage at an electrolytic voltage level to the pair of electrodes to electrolyze the raw water and the aqueous electrolyte solution, the voltage control means including a current/voltage sensor, a power source and an electrolysis control unit controlling the voltage application from the power source based on a current measured by the current/voltage sensor, wherein the voltage control means is configured to increase the electrolytic voltage level applied to the pair of electrodes during a first predetermined time and maintain the electrolytic voltage level applied to the pair of electrodes at a predetermined voltage level when the electrolytic current is less than the predetermined current after the first predetermined time;
   an electrolyte supply unit supplying the electrolyte to the aqueous electrolyte solution; and
   an electrolysis control means, which is part of the electrolysis control unit, for controlling supply of the electrolyte by the electrolyte supply unit to the electrolyte solution circulating system to increase an electrolytic current to be equal to or greater than a predetermined current after the first predetermined time;
   wherein the first predetermined time is an amount of time required for the electrolytic current to reach the predetermined current in a case where a predetermined amount of electrolyte is provided to the aqueous electrolyte solution after starting the electrolysis of water, the predetermined amount of electrolyte being an amount to maintain a concentration of the aqueous electrolyte solution within a predetermined range as well as to maintain a pH value within a predetermined region.

7. The electrolyzed water producing apparatus according to claim 6, wherein:
   the electrolyte supply means is capable of switching between an intermittent operation and a continuous operation; and
   the electrolysis control means is configured to cause the electrolyte supply means to operate intermittently until the first predetermined time elapses from the start of the electrolysis and then operate continuously after the lapse of the first predetermined time to establish and maintain the predetermined current.

8. The electrolyzed water producing apparatus according to claim 6, wherein when the electrolytic current is equal to or greater than the predetermined current after lapse of the first predetermined time, the electrolysis control means causes the electrolyte supply unit to switch to the intermittent operation.

9. The electrolyzed water producing apparatus according to claim 6 further includes electrolysis stopping means for stopping the electrolysis when the electrolytic current remains less than the predetermined current even after lapse of a second predetermined time from the point in time at which the first predetermined time has elapsed;
   wherein the electrolysis stopping means, which is part of the electrolysis control unit, controls the current/voltage sensor, the power source, a three-way valve, an electrolyte supply pump, a circulation pump and a shut-off valve.

* * * * *